US012798879B2

(12) United States Patent
Taniai et al.

(10) Patent No.: US 12,798,879 B2
(45) Date of Patent: Nov. 17, 2026

(54) TRANSPORT SYSTEM

(71) Applicant: TOYOTA JIDOSHA KABUSHIKI KAISHA, Toyota (JP)

(72) Inventors: Osamu Taniai, Okazaki (JP); Takeshi Matsui, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 335 days.

(21) Appl. No.: 18/438,910

(22) Filed: Feb. 12, 2024

(65) Prior Publication Data

US 2024/0343484 A1 Oct. 17, 2024

(30) Foreign Application Priority Data

Apr. 17, 2023 (JP) ................................. 2023-067020

(51) Int. Cl.
*B65G 1/04* (2006.01)
*B65G 43/08* (2006.01)

(52) U.S. Cl.
CPC ........... *B65G 1/0492* (2013.01); *B65G 43/08* (2013.01); *B65G 2203/0216* (2013.01); *B65G 2203/0233* (2013.01); *B65G 2203/044* (2013.01)

(58) Field of Classification Search
None
See application file for complete search history.

(56) References Cited

U.S. PATENT DOCUMENTS

| | | | | |
|---|---|---|---|---|
| 2019/0135538 | A1 | 5/2019 | Nakanishi | |
| 2019/0329978 | A1 | 10/2019 | Li et al. | |
| 2020/0326712 | A1 | 10/2020 | Tang et al. | |
| 2022/0219902 | A1* | 7/2022 | Zheng | G05D 1/0094 |
| 2022/0324646 | A1* | 10/2022 | Sohn | G06Q 30/0601 |
| 2023/0050980 | A1* | 2/2023 | Zahdeh | G01S 17/89 |

FOREIGN PATENT DOCUMENTS

| | | | |
|---|---|---|---|
| JP | 2000-235416 | A | 8/2000 |
| JP | 2011-105469 | A | 6/2011 |
| JP | 2019-85224 | A | 6/2019 |
| JP | 6848081 | B2 | 3/2021 |
| JP | 2022-144293 | A | 10/2022 |
| JP | 2023-104314 | A | 7/2023 |

* cited by examiner

*Primary Examiner* — Jonathan Snelting
(74) *Attorney, Agent, or Firm* — Oliff PLC

(57) ABSTRACT

A transport system includes a carrier provided for placing a package to be transferred on a shelf or for transferring the package from the shelf, a transport robot on which the carrier is mounted and configured to move to transfer the package between the shelf and the carrier, a sensor unit provided to detect the presence or absence of the package on the shelf or the carrier, and a detection unit configured to detect an abnormality in transfer of the package according to a detection result of the sensor unit.

8 Claims, 14 Drawing Sheets

TRANSPORT SYSTEM

CROSS-REFERENCE TO RELATED APPLICATION

This application claims priority to Japanese Patent Application No. 2023-067020 filed on Apr. 17, 2023, incorporated herein by reference in its entirety.

BACKGROUND

1. Technical Field

The present disclosure relates to a transport system.

2. Description of Related Art

Japanese Unexamined Patent Application Publication No. 2022-144293 (JP 2022-144293 A) discloses a robot equipped with a traveling device and an accommodation device that accommodates an item. The robot is equipped with an item grasping device that grasps items. The item grasping device grasps an item from an item accommodation device and places it in the accommodation device. Further, the article grasping device grasps an item from the accommodation device and places it in the item accommodation device.

SUMMARY

In JP 2022-144293 A, since an item grasping device is used, efficient package transfer is not realized. When transporting packages using a moving body such as a robot, it is desirable to efficiently transfer (load or unload) the packages. Transport efficiency can be increased by simply transferring packages. Further, when an abnormality occurs in the transfer of packages, there is a risk that an excessive load will be applied to the robot. A system that can achieve both transport efficiency and abnormality control is desirable.

A first aspect of the present disclosure relates to a transport system including a carrier, a transport robot, a sensor unit, and a detection unit. The carrier is provided for placing a package to be transferred on a shelf or for transferring the package from the shelf. The transport robot on which the carrier is mounted is configured to move to transfer the package between the shelf and the carrier. The sensor unit is provided to detect presence or absence of the package on the shelf or the carrier. The detection unit is configured to detect an abnormality in transfer of the package according to a detection result of the sensor unit.

In the first aspect, the package may be provided with a marker, and the sensor unit may be an optical sensor configured to detect the marker.

In the first aspect, the sensor unit may include a first sensor arranged facing forward in a movement direction of the transport robot, and a second sensor arranged facing rearward in the movement direction of the transport robot.

In the first aspect, the first sensor may be configured to capture an image of the marker, and the transport robot may be configured to approach the shelf based on the captured image of the marker.

In the first aspect, the transport robot may further include wheels, and a drive sensor configured to detect drive information regarding drive of the wheels, and the detection unit may be configured to detect the abnormality based on the drive information.

In the first aspect, the detection unit may be configured to detect the abnormality when the drive torque of the wheels is equal to or greater than a threshold value.

In the first aspect, the wheels may be provided on the right and left sides of the transport robot, and the detection unit may be configured to detect the abnormality when a difference in drive torque between the wheels provided on the right and left sides of the transport robot is a predetermined value.

In the first aspect, when the detection unit detects the abnormality, the transport robot may be configured to decelerate or stop.

In the first aspect, when the detection unit detects the abnormality, the transport robot may be configured to notify a server of occurrence of the abnormality.

In the first aspect, the shelf may be a mobile shelf configured to be mounted on another transport robot and moved.

The transport system according to the first aspect may further include the shelf.

With the aspect of the present disclosure, it is possible to provide a transport system that can appropriately transport a package.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

The present disclosure will be described below through an embodiment of the present disclosure, but the applicable embodiment is not limited to the following embodiment. Further, not all of the configurations described in the embodiment are essential as means for solving the problem.

First Embodiment

Figure 1:
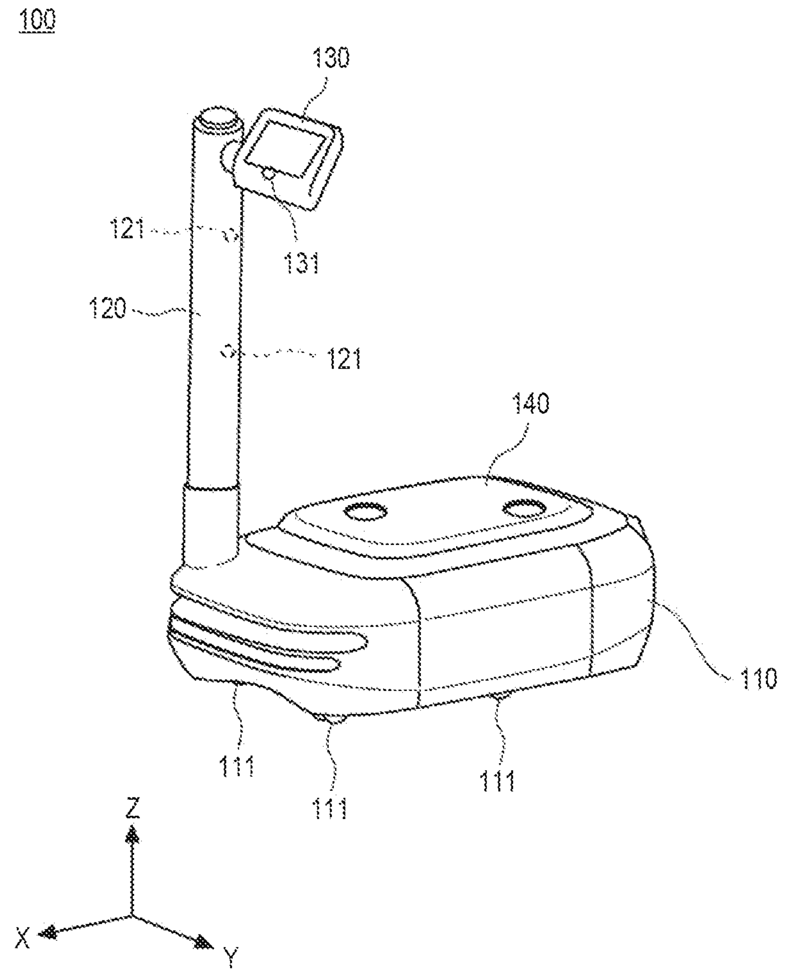
FIG. 1 is a perspective view schematically illustrating an overall configuration of a transport robot according to the present embodiment.

FIG. 1 is a perspective view illustrating the overall configuration of a transport robot 100 used in a transport system according to the present embodiment. In the following description, an XYZ orthogonal coordinate system will be used as appropriate. The X direction is a front-rear direction of the transport robot 100, the Y direction is a right-left direction, and the Z direction is a vertical up-down direction. More specifically, the +X direction is defined as a forward direction of the transport robot 100, and the −X direction is defined as a rearward direction of the transport robot 100. The +Y direction is a left direction of the transport robot 100, and the −Y direction is a right direction of the transport robot 100. The +Z direction is a vertically upward direction, and the −Z direction is a vertically downward direction.

The transport robot 100 can move both forward and rearward. That is, when wheels are rotated in the forward direction, the transport robot 100 moves forward, and when the wheels are rotated in a reverse direction, the transport robot 100 moves rearward. Adjusting the rotation speed of the right and left wheels differently allows the transport robot 100 to turn right and left.

The transport robot 100 includes a chassis 110, a stand 120, and an operation unit 130. The chassis 110 is equipped with wheels 111, an axle, a battery, a control computer, a drive motor, and the like. The chassis 110 rotatably holds the wheels 111. Further, the chassis 110 may be provided with various sensors such as a camera and a distance measuring sensor. Here, the description will be given assuming that the transport robot 100 is an autonomous transport robot. Of course, the transport robot 100 may be a transport robot that moves according to a user's operation.

The chassis 110 accommodates a raising/lowering stage 140 used to load and unload a package. The raising/lowering stage 140 is arranged on an upper side of the chassis 110. The raising/lowering stage 140 includes a raising/lowering stage driven by a motor or the like. The chassis 110 has a built-in motor and guide mechanism for raising/lowering. The upper surface of the raising/lowering stage 140 becomes a placing surface on which a wagon is placed. The raising/lowering stage 140 has a lift mechanism that lifts the wagon. The raising/lowering stage 140 supports a shelf portion serving as a carrier. The space above the raising/lowering stage 140 becomes a loading space for loading a package. A rechargeable secondary battery is mounted on the chassis 110.

The stand 120 is attached to the chassis 110. The stand 120 is a rod-shaped member extending upward from the chassis 110. Here, the stand 120 is formed in a cylindrical shape of which the longitudinal direction is the Z direction. The longitudinal direction of the stand 120 is provided parallel to the Z direction. The stand 120 is located outside the raising/lowering stage 140. In other words, the stand 120 is arranged so as not to interfere with the raising/lowering movement of the raising/lowering stage 140. The stand 120 is arranged at one end of the chassis 110 in the Y direction (right-left direction). The stand 120 is attached near the right front corner of the chassis 110. The stand 120 is provided at the end of the chassis 110 on the +X side and the −Y side in the XY plane.

The stand 120 supports the operation unit 130. The operation unit 130 is attached near the upper end of the stand 120. Thereby, the operation unit 130 can be installed at a height that is easy for a user to operate. In other words, the stand 120 extends to a height that is convenient for a standing user to operate. The operation unit 130 extends from the stand 120 to the +Y side. The operation unit 130 is arranged at the center of the chassis 110 in the right-left direction.

The operation unit 130 includes a touch panel monitor and the like that accepts operations of a user. Of course, the operation unit 130 may also include a microphone for audio input. The monitor of the operation unit 130 faces away from the chassis 110. In other words, a display screen (operation screen) of the operation unit 130 is situated on the +X side. The operation unit 130 may be provided to be detachable from the stand 120. That is, the stand 120 may have a holder attached thereto that holds the touch panel. By operating the operation unit 130, the user can input the destination of the package, transportation information regarding the package, and the like. Further, the operation unit 130 can display to the user information such as the contents, the destination, and the like of the package being transported, the package scheduled to be transported.

Further, a front sensor 131 is attached to the operation unit 130. The front sensor 131 is installed facing forward, that is, in the +X direction. Further, the stand 120 has a rear sensor 121 of a built-in type. The rear sensor 121 is installed facing rearward, that is, in the −X direction. The rear sensor 121 and the front sensor 131 are used to detect whether the transfer of a package has been carried out normally. The rear sensor 121 and the front sensor 131 are optical sensors such as cameras.

A user stores a package (also referred to as an item or a transported object) in a shelf mounted on the transport robot 100 and requests transportation. The transport robot 100 autonomously moves to a set destination and transports a package. In other words, the transport robot 100 executes a package transportation task (hereinafter also simply referred to as a task). In the following description, the location where the package is loaded is referred to as the transport source or loading location, and the location where the package is delivered is referred to as the transport destination or destination.

For example, assume that the transport robot 100 moves within a general hospital that has multiple medical departments. The transport robot 100 transports supplies, consumables, medical instruments, and the like between the medical departments. For example, the transport robot 100 may deliver a package from a nurse's station in one department to a nurse's station in another department. Alternatively, the transport robot 100 delivers packages from a storehouse for supplies and medical instruments to a nurse's station in a medical department. Additionally, the transport robot 100 delivers medicine dispensed at the pharmacy to the medical department and patient where they are scheduled to be used.

Examples of the package include medicine, consumables such as bandages, specimens, test instruments, medical instruments, hospital food, and supplies such as stationery. Medical devices include blood pressure monitors, blood transfusion pumps, syringe pumps, foot pumps, nurse calls, bed exit sensors low-pressure continuous inhalers, electrocardiogram monitors, pharmaceutical infusion controllers, enteral feeding pumps, ventilators, cuff pressure gauges, touch sensors, suction devices, nebulizers, pulse oximeters, artificial resuscitators, aseptic devices, echo devices, and the like. Additionally, meals such as hospital food and test food may be transported. Further, the transport robot 100 may transport used equipment, used tableware, and the like. When the destination is on a different floor, the transport robot 100 may move using an elevator or the like.

Figure 2:
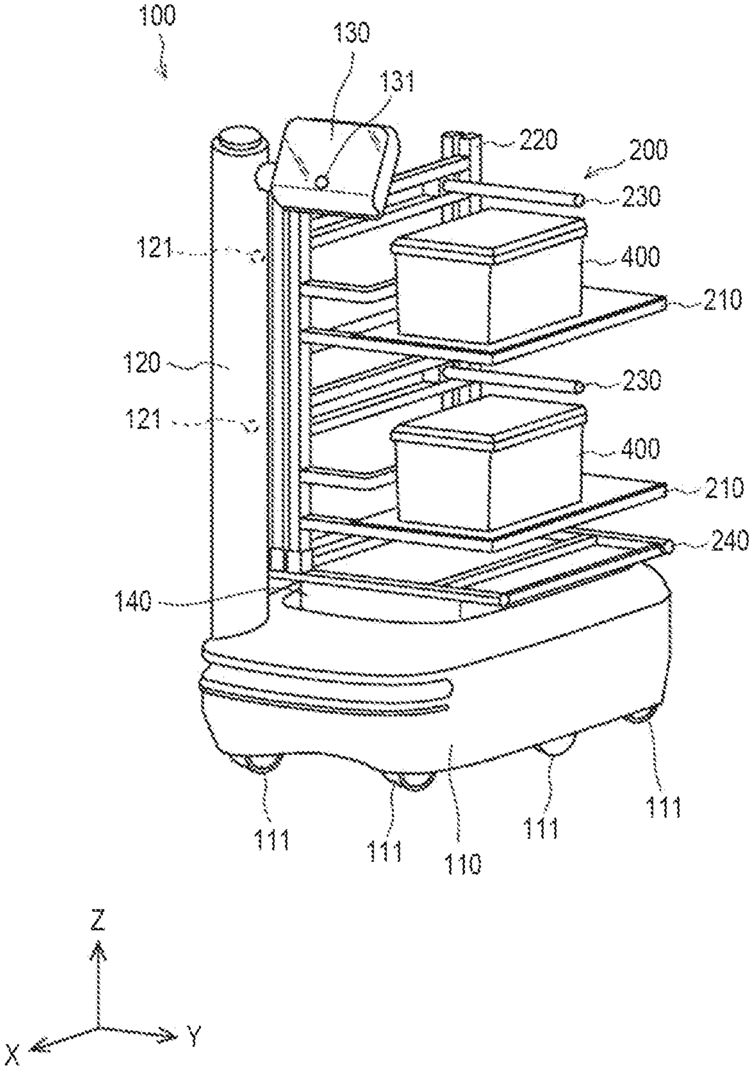
FIG. 2 is a perspective view illustrating a configuration in which a transport robot is equipped with a carrier.

Next, a configuration in which a shelf serving as a carrier is mounted on the transport robot 100 will be described using FIG. 2. As illustrated in FIG. 2, a shelf unit 200 is provided above the chassis 110. The shelf unit 200 is attached to the chassis 110. Therefore, the chassis 110 supports the shelf unit 200. The shelf unit 200 includes a shelf board 210, a frame 220, and a base plate 240. As will be described below, the transport robot 100 can transfer a package to and from an installed shelf by passing through the installed shelf. That is, the transport robot 100 can receive a package on the installed shelf by passing through the installed shelf. Alternatively, the transport robot 100 can transfer the package on the shelf unit 200 to the installed shelf by passing through the installed shelf.

The shelf board 210 is a plate-shaped member provided along the XY plane. In FIG. 2, two shelf boards 210 are provided on the shelf unit 200. A package 400 is placed on a shelf board 210. In other words, the shelf board 210 supports the package 400. The two shelf boards 210 are arranged at different heights. The package 400 is placed on each of the two shelf boards 210. In other words, the two shelf boards 210 are spaced apart in the Z direction by a distance greater than the height of the package 400. The shelf unit 200 serves as a stage of a moving body on which a package is placed.

Although the shelf unit 200 has two shelf boards 210 in FIG. 2, the number of shelf boards 210 is not particularly limited. The number of shelf boards 210 may be one, or three or more. The shelf board 210 is placed directly above the chassis 110. In other words, the shelf board 210 overlaps the chassis 110 in the XY plane view. The shelf board 210 is arranged above the raising/lowering stage 140.

The base plate 240 is a plate-shaped member provided along the XY plane. The base plate 240 is attached to the upper surface of the raising/lowering stage 140. The base plate 240 is placed on the −X side of the stand 120. For example, the base plate 240 may be fixed to the chassis 110 using fixing devices such as a bolt.

The frame 220 is attached to the base plate 240. The base plate 240 supports the frame 220. The frame 220 is attached to the base plate 240 at the −Y side end of the base plate 240. The frame 220 extends upwardly from the base plate 240. That is, the frame 220 is placed above the right end of the chassis 110. The frame 220 is placed on the −X side of the stand 120.

The frame 220 supports the shelf board 210. The frame 220 is attached to the chassis 110 outside of the raising/lowering stage 140. Outside the raising/lowering stage 140, the frame 220 extends upwardly. The shelf board 210 extends from the frame 220 to the +Y side. In other words, the shelf board 210 is provided to protrude from the frame 220 toward the +Y side. In the XY plane, the shelf board 210 is approximately the same size as the chassis 110.

The shelf unit 200 transfers the package 400 to and from the installed shelf. Facilities where the transport robot 100 is used are equipped with installed shelves. Further, the package placed on the installed shelf is transferred to the shelf unit 200. Also, the package 400 placed on the shelf unit 200 is transferred to the installed shelf. The frame 220 is provided with a contact portion 230 for transferring a package 500. For example, the contact portion 230 is a rod-shaped member extending in the +Y direction.

The package 400 is transferred by the transport robot 100 passing through the installed shelf. The packages 400, 500 can be transferred between the shelf unit 200 and the installed shelf without using a transport actuator. In other words, there is no need to provide an installed shelf or transport robot with a robot arm for transfer. By mounting the shelf unit 200, a package can be loaded and unloaded easily and quickly.

Figure 3:
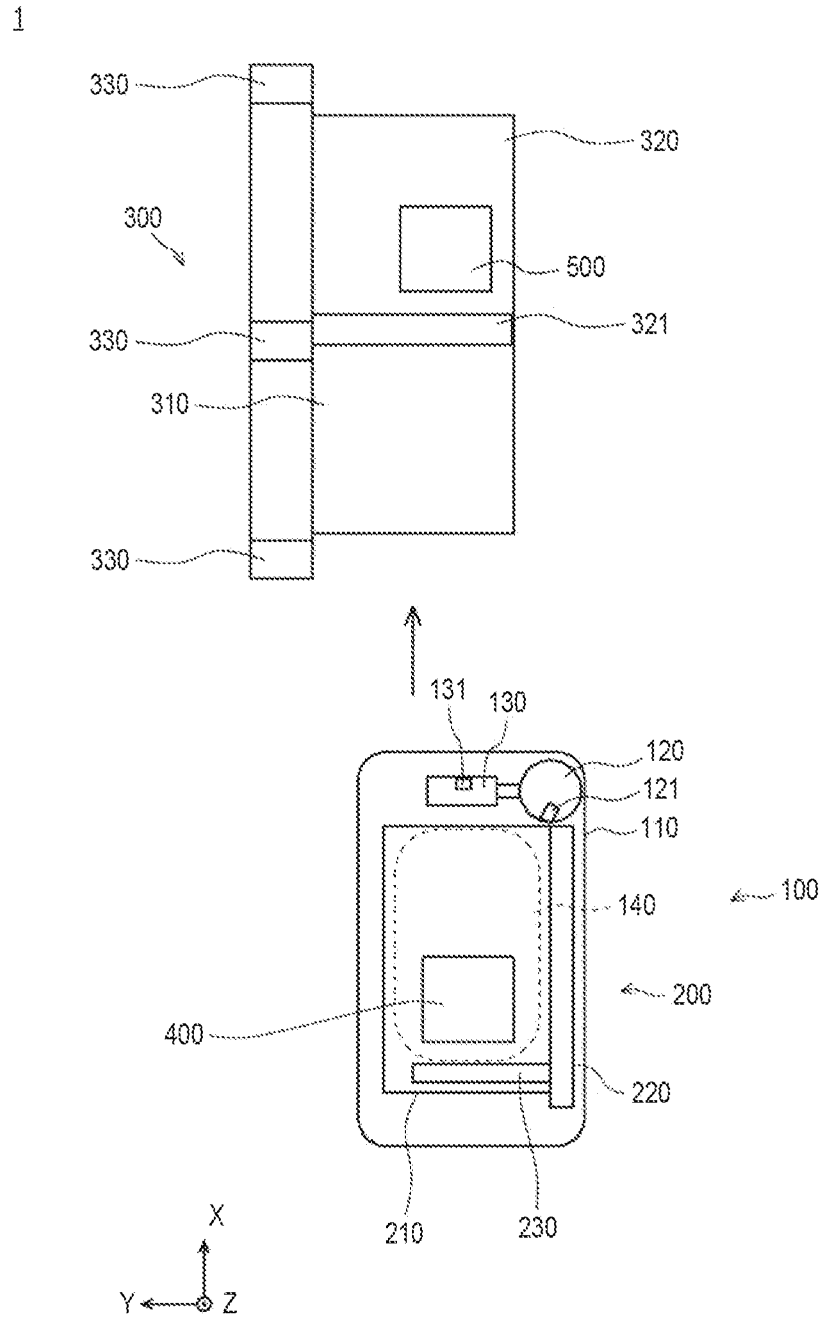
FIG. 3 is a top view illustrating a configuration of a transport system before transfer.
Figure 4:
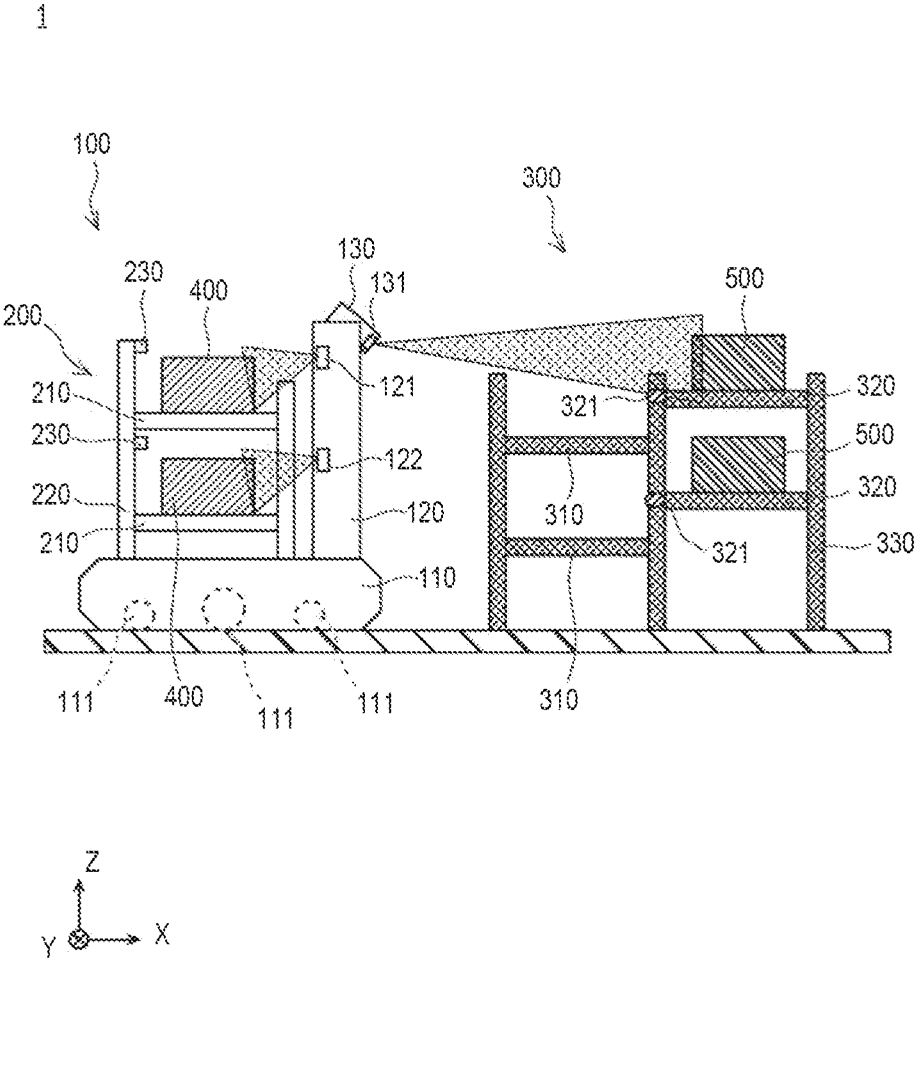
FIG. 4 is a side view illustrating the configuration of the transport system before transfer.
Figure 5:
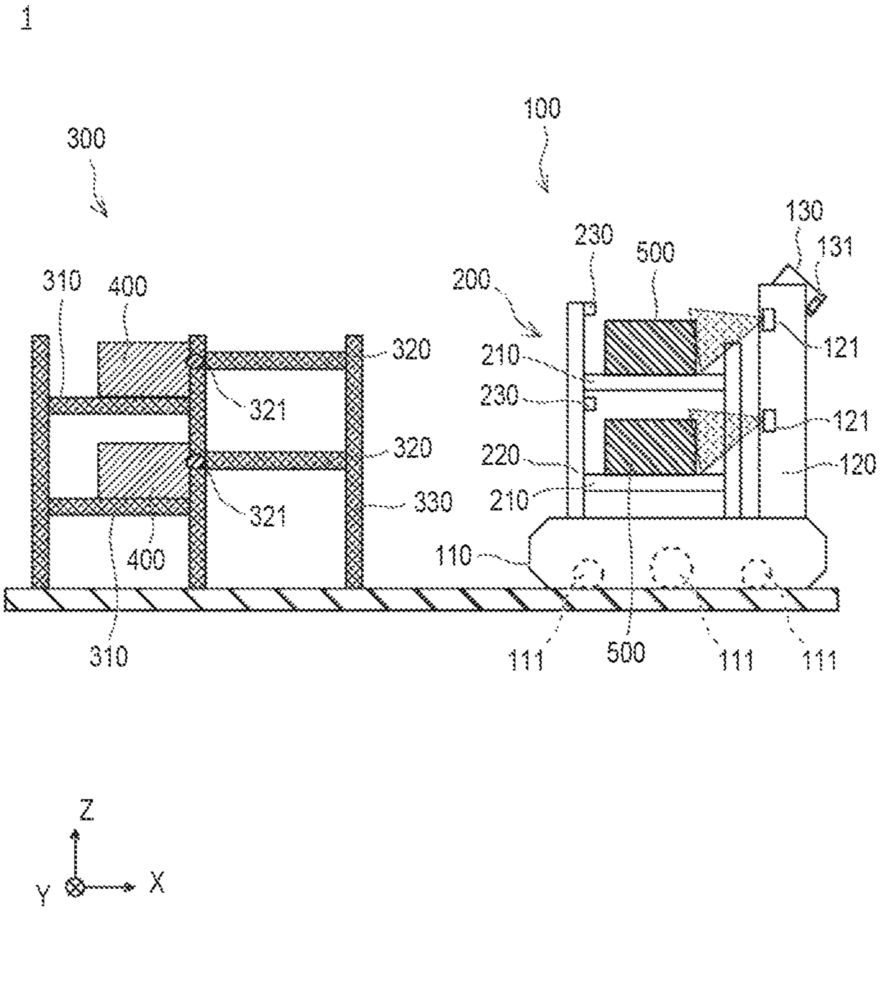
FIG. 5 is a side view illustrating the configuration of the transport system after transfer.

The configuration of the transport robot 100 and installed shelf will be described using FIGS. 3 to 5. FIGS. 3 to 5 are diagrams illustrating the configuration of a transport system 1 including the installed shelf 300 and the transport robot 100. FIG. 3 is a top view schematically illustrating the configuration of the installed shelf 300 and the transport robot 100. FIGS. 4 and 5 are side cross-sectional views schematically illustrating the configurations of the installed shelf 300 and the transport robot 100. FIGS. 3 and 4 illustrate the configuration before the package is transferred. FIG. 5 illustrates the configuration after the package is transferred, that is, the transport robot 100 moves in the +X direction from the state illustrated in FIGS. 3 and 4 and approaches the installed shelf 300. Then, when the transport robot 100 passes the installed shelf 300, the packages 400, 500 are transferred. When the transport robot 100 passes the installed shelf 300, the transfer is completed as illustrated in FIG. 5.

The installed shelf 300 is a fixed shelf fixed to a warehouse, aisle, or the like. The package 500 is placed on the installed shelf 300. The transport robot 100 is provided with the shelf unit 200. The shelf board 210 of the shelf unit 200 mounted on the transport robot 100 can also be referred to as a stage of a moving body or a carrier.

When the transport robot 100 passes the installed shelf 300, the package 500 is transferred from the installed shelf 300 to the shelf unit 200, and the package 400 is transferred from the shelf unit 200 to the installed shelf 300. That is, when the transport robot 100 passes the installed shelf 300, the packages 400, 500 are transferred between the installed shelf 300 and the shelf unit 200. Since the transport robot 100 can transfer the package 400 and the package 500 almost simultaneously, it enables efficient package transshipment. Although the description will be given assuming that the packages 400, 500 are rectangular parallelepiped boxes, the shapes of the packages 400, 500 are not particularly limited.

The installed shelf 300 includes a first shelf board 310, a frame 330, and a second shelf board 320. The first shelf board 310 serves as a first stage to which the package 400 is transferred. The second shelf board 320 serves as a second stage on which the package 500 is placed. Before the transfer, the first shelf board 310 is an empty shelf on which no package 500 is placed. When the transfer is completed, the package 500 is placed on the shelf board 210, and the package 400 is placed on the first shelf board 310. After the transfer is completed, the second shelf board 320 becomes an empty shelf on which no package 500 is placed. Although the first shelf board 310 and the second shelf board 320 are flat plates parallel to the XY plane, they may have a chute structure that is inclined along the Y direction.

Similarly to the shelf board 210, the first shelf board 310 is formed in two stages, upper and lower. The second shelf board 320 is also formed in two stages, upper and lower, similarly to the shelf board 210. Here, the package 400 on the shelf board 210 on the upper stage side is transferred to the first shelf board 310 on the upper stage side. The package 500 on the second shelf board 320 on the upper stage side is transferred to the shelf board 210 on the upper stage side.

In the following description, the configuration of the same stage of the two-stage shelf board will be described. For example, only the shelf board on the upper stage side will be described, and the description of the shelf board on the lower stage side will be omitted.

The first shelf board 310 is placed on the −X side of the second shelf board 320. The first shelf board 310, the second shelf board 320, and the shelf board 210 have different heights. Specifically, the first shelf board 310 is installed lower than the shelf board 210, and the second shelf board 320 is installed higher than the shelf board 210. Even when the transport robot 100 moves, the heights of the first shelf board 310, second shelf board 320, and shelf board 210 do not change.

As the transport robot 100 moves, the shelf board 210 passes through the height between the first shelf board 310 and the second shelf board 320. Specifically, when the transport robot 100 passes, the package 400 on the shelf board 210 is transferred to the first shelf board 310. Therefore, the upper surface (placing surface) of the first shelf board 310 is below the lower surface of the package 400. When the transport robot 100 passes, the package 500 on the second shelf board 320 is transferred to the shelf board 210. Therefore, the upper surface (placing surface) of the first shelf board 310 is below the lower surface of the package 400.

When the transport robot 100 moves in the +X direction, the package 400 on the shelf board 210 is first transferred to the first shelf board 310. This creates a space on the shelf board 210 for placing the package 500. The transfer of the package 400 from the shelf unit 200 to the installed shelf 300 is completed. Further, when the transport robot 100 moves in the +X direction, the package 500 on the second shelf board 320 is transferred to the shelf board 210. The transfer of the package 500 from the installed shelf 300 to the shelf unit 200 is completed.

The installed shelf 300 includes a contact portion 321. The contact portion 321 is located at a higher position than the shelf board 210. Specifically, the contact portion 321 is provided at the height of the package 400. When the contact portion 321 comes into contact with the package 400, the package 400 is pushed out onto the first shelf board 310. Here, the contact portion 321 is provided at the height of the second shelf board 320. For example, the contact portion 321 is provided at the −X side end of the second shelf board 320. The contact portion 321 is a rod-shaped member extending from the frame 330 in the −Y direction. Alternatively, the end surface of the second shelf board 320 may be the contact portion 321.

When the contact portion 321 comes into contact with the package 400, the movement of the package 400 is restricted. In other words, since the contact portion 321 holds down the package 400, the package 400 will not move as the transport robot 100 moves. Therefore, the contact portion 321 can push the package 400 out of the shelf board 210 in the −X direction. The package 400 is transferred from the shelf board 210 to the first shelf board 310.

The shelf unit 200 includes the contact portion 230. The contact portion 230 is located at a higher position than the second shelf board 320 and the package 400. Specifically, the contact portion 230 is provided at the height of the package 500. As will be described below, when the contact portion 230 comes into contact with the package 500, the package 500 is pushed onto the shelf board 210. The contact portion 230 is placed on the −X side of the package 400. Here, in the X direction, the contact portion 230 is arranged near the end of the shelf board 210 on the −X side. The contact portion 230 is attached to a frame 220. For example, the contact portion 230 is a member extending from the frame 220 in the +Y direction.

When the contact portion 230 comes into contact with the package 500, the package 500 moves in the +X direction along with the movement of the transport robot 100. In other words, the contact portion 230 can push the package 500 from above the second shelf board 320 in the +X direction. The package 500 is transferred from the second shelf board 320 to the shelf board 210.

The frame 330 and the like are arranged at positions where they do not interfere with the shelf unit 200. Similarly, the stand 120, the frame 220, and the like are placed at positions where they do not interfere with the installed shelf 300.

Further, the transport robot 100 includes the front sensor 131 and the rear sensor 121. The front sensor 131 is a camera placed facing forward in the movement direction of the transport robot 100. The front sensor 131 is provided to detect the presence or absence of packages on the first shelf board 310 and the second shelf board 320. The rear sensor 121 is provided to detect the presence or absence of a package on the shelf board 210.

As illustrated in FIG. 4, the front sensor 131 captures an images of the package 500 before the packages 400, 500 are transferred. The rear sensor 121 is a camera arranged facing rearward in the movement direction. The rear sensor 121 and front sensor 131 capture moving images or continuous still images. Although the front sensor 131 captures only images of the package 500 on the upper stage in FIG. 4, it may capture images of not only the package 500 on the upper stage but also the package 500 on the lower stage. Alternatively, the transport robot 100 may be separately provided with a front sensor 131 that captures images of the package 500 on the lower stage.

The rear sensor 121 is arranged facing the rear of the transport robot 100. Therefore, the image captured by the rear sensor 121 is defined as the rear image. Further, the front sensor 131 is arranged facing forward of the transport robot 100. Therefore, the image captured by the front sensor 131 is defined as the front image.

Before the packages 400, 500 are transferred, the rear sensor 121 captures images of the package 400. In other words, the front sensor 131 is mounted on the transport robot 100 in such an orientation that the angle of view of the front sensor 131 includes the package 500 before being transferred. In the state before transfer illustrated in FIG. 4, the package 500 is included in the front image. The rear sensor 121 is mounted on the transport robot 100 in such an orientation that the angle of view of the rear sensor 121 includes the package 400 before being transferred. In the state before transfer illustrated in FIG. 4, the package 400 is included in the rear image. In the state after transfer illustrated in FIG. 5, the package 500 is included in the rear image.

Figure 6:
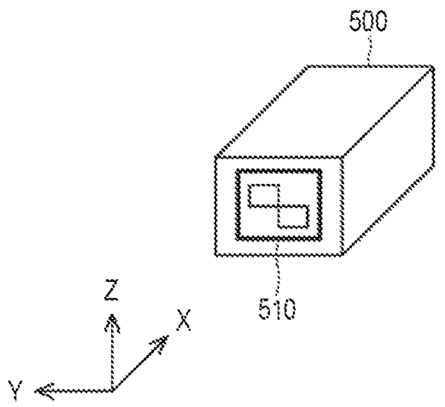
FIG. 6 is a schematic diagram illustrating a marker provided on a package.

Further, a marker 510 is attached to the side surface of the package 500, as illustrated in FIG. 6. The marker 510 is provided to detect the position of the package 500. The marker 510 is, for example, a two-dimensional marker such as a QR code (registered trademark), and is used to detect or identify the package 500. The package 400 is also provided with a marker 510. For example, a unique marker 510 is attached to each of the packages 400, 500. The marker 510 includes ID information such as identification numbers of the packages 400, 500. The marker 510 of the package 500 will be described below. The marker 510 of the package 400 is the same as that of the package 500, so a description thereof will be omitted.

The marker 510 is preferably provided on two opposing sides of the package 500. That is, the same markers 510 are formed on the front and rear surfaces in the X direction. Thereby, the front sensor 131 can capture an image of the marker 510 before transfer, and the rear sensor 121 can capture an image of the marker 510 after transfer.

Before transferring the package 500, the front sensor 131 captures an image of the marker 510 of the package 500. Thereby, the transport robot 100 can detect that the package 500 to be received is on the installed shelf 300. The transport robot 100 may send an alarm, message, or the like when the package 500 to be received is not detected. Further, before the package 400 is transferred, the rear sensor 121 captures an image of the marker 510 of the package 400. Thereby, the transport robot 100 can detect that the package 400 to be transferred is on the shelf unit 200.

The transport robot 100 can specify the packages 400, 500 from the captured image of the marker 510. Further, based on the captured image of the marker 510, it is possible to detect whether the packages 400, 500 are placed at normal positions. For example, when the packages 400, 500 are tilted or deviated from their normal loading position, the transport robot 100 may send an alarm, message, or the like. In this way, the transport robot 100 can detect a transfer abnormality in advance based on the captured image of the marker 510.

Further, when the packages 400, 500 specified from the identification information of the marker 510 are not appropriate packages, it is possible to detect a transfer abnormality. For example, assume that a large number of packages of different sizes and weights are prepared. The transport robot 100 can detect from the identification information that packages 400, 500 of a size and weight that cannot be loaded are placed on the shelf unit 200 and installed shelf 300. In such a case, the transport robot 100 may send an alarm, message, or the like. In this way, the transport robot 100 can detect a transfer abnormality in advance based on the captured image of the marker 510.

The relative position of the transport robot 100 with respect to the package 500 can be detected according to the position and size of the marker 510 in the captured image. The transport robot 100 then performs movement control based on the marker 510 included in the front image. That is, the transport robot 100 approaches the installed shelf 300 based on the front image. For example, the transport robot 100 moves while adjusting the right and left positions based on the front image of the front sensor 131. By using the front image including the marker 510 to control the movement of the transport robot 100, the transport robot 100 can move to an appropriate transfer position. Specifically, the transport robot 100 can accurately control its own Y-direction position relative to the installed shelf 300.

For example, a front image at a normal transfer position is acquired in advance. The transport robot 100 moves so that the position of the marker 510 in the front image currently being captured matches the position of the marker 510 included in the front image at the normal transfer position. The transport robot 100 travels while feedback controlling the position of the transport robot 100 according to the position of the marker 510 in the captured image. Thereby, deviation from the normal transfer position can be suppressed, the transport robot 100 can appropriately transfer the packages 400, 500, and the position of the transport robot 100 can be corrected according to the position coordinates of the marker 510 in the front image. Therefore, even when the position of the package 500 is deviated on the installed shelf 300, the package 500 can be transferred appropriately. Further, the transport robot 100 can move without reducing its movement speed to align the transfer position. Therefore, efficient transport is possible.

Further, the rear sensor 121 captures the images of the package 400 before transfer, and captures the images of the package 500 after transfer. Further, after transfer, the front sensor 131 captures the images of the package 400. The rear sensor 121 sequentially captures the images of the markers 510 of the packages 400, 500. The front sensor 131 captures the images of the marker 510 of the package 400. The transport robot 100 determines whether the transfer was performed normally based on the front image and the rear image. The transport robot 100 detects transfer abnormalities based on the front image and the rear image.

For example, the transport robot 100 can determine whether the transfer has been appropriately completed, depending on the position of the marker 510 before and after the transfer. Further, before transfer, the rear image of the rear sensor 121 includes the marker 510 of the package 400. After transfer, the rear image of the rear sensor 121 includes the marker 510 of a package 500. The transport robot 100 can determine whether the transfer has been performed normally based on whether the ID information or the like of the marker 510 has changed.

Figure 7:
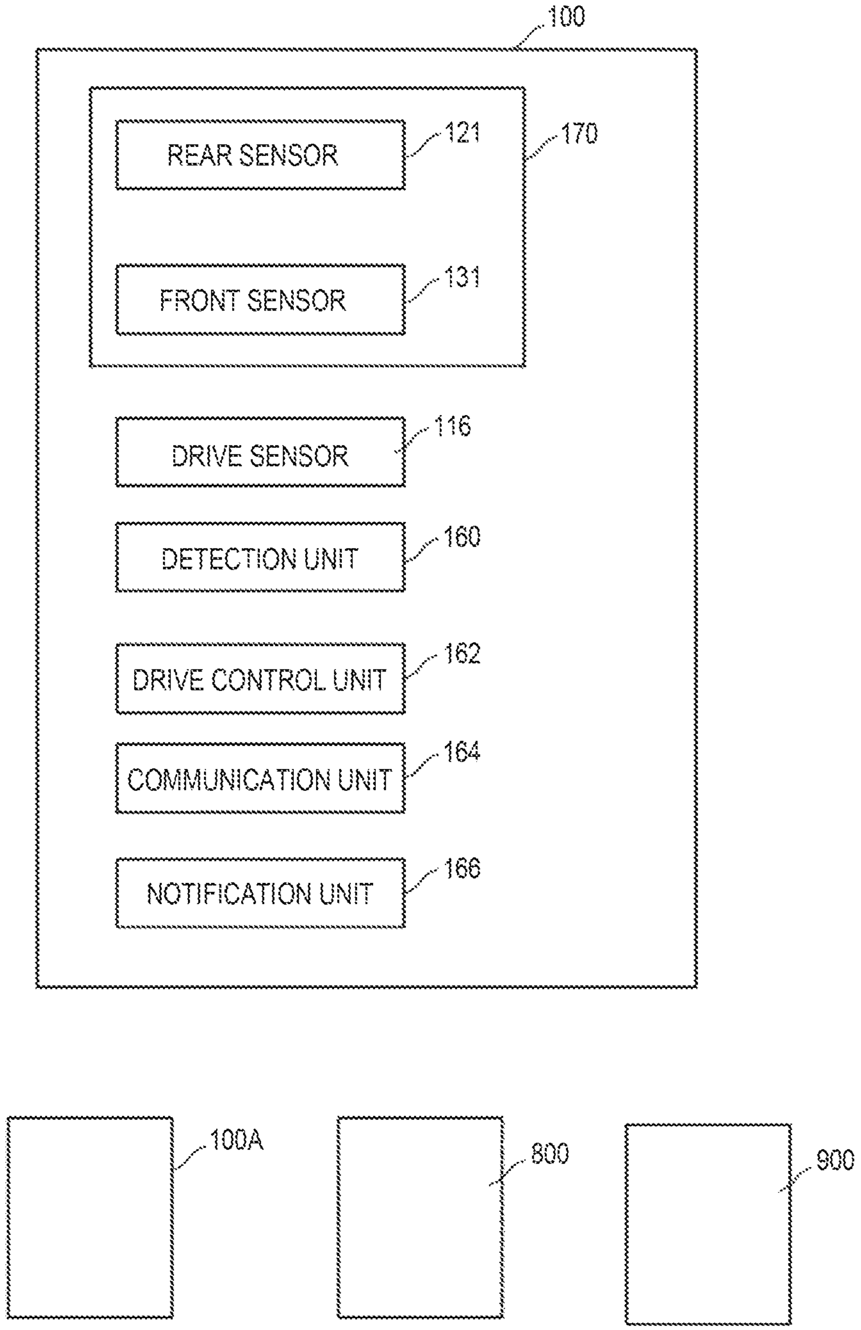
FIG. 7 is a control block diagram illustrating a configuration for detecting a transfer abnormality.

FIG. 7 is a control block diagram illustrating a configuration for detecting a transfer abnormality. The transport robot 100 includes the rear sensor 121, the front sensor 131, a drive sensor 116, a detection unit 160, a drive control unit 162, a communication unit 164, and a notification unit 166. The rear sensor 121 and the front sensor 131 are also collectively referred to as a sensor unit.

As described above, the front sensor 131 captures a front image, and the rear sensor 121 captures a rear image. The drive control unit 162 has a drive motor for the wheel 111 and its controller, and controls the drive of the wheel 111. Specifically, the drive control unit 162 generates a motor command value indicating the drive torque and rotation speed of the wheel 111. As a result, each wheel 111 rotates at a desired rotation speed. As described above, when the packages 400, 500 are transferred, the transport robot 100 moves based on the position of the marker 510 in the front image. In other words, the drive control unit 162 controls the rotation speed of the wheel 111 so that the marker 510 in the front image is positioned at a desired position.

The drive sensor 116 detects drive information regarding the drive of the wheel 111. For example, the drive sensor 116 detects the drive torque of the wheel 111. The drive sensor 116 detects the drive torque of the right and left wheels 111, respectively. For example, the drive sensor 116 detects the current flowing through the drive motor of the drive control unit 162, and detects the drive torque of the wheel 111 according to the current value.

The detection unit 160 detects a transfer abnormality based on the detection results of the drive sensor 116, rear sensor 121, and front sensor 131. The detection unit 160 can analyze the captured image of the marker 510 and read ID information and the like. Further, the detection unit 160 can estimate the relative position of the transport robot 100 with respect to the packages 400, 500 from the position of the marker 510 in the captured image.

The detection unit 160 detects whether the transfer was performed normally based on the drive information detected by the drive sensor 116 or the captured image. For example, the detection unit 160 detects that a transfer abnormality has occurred in any of the below cases. When a transfer abnormality is detected, the drive control unit 162 may decelerate or stop the transport robot 100.

(1) When the detected value of the drive sensor 116 becomes an abnormal value during transfer (2) When the image of the marker 510 is not captured properly (3) When the rear image of the rear sensor 121 does not transition in the order of package present→no package→package present (4) When the identification information of the marker 510 detected from the rear image of the rear sensor 121 does not change In the case of (1), when the drive torque exceeds a threshold value, the detection unit 160 detects a transfer abnormality. That is, when an abnormal load is applied to the wheel 111, the detection unit 160 determines that a transfer abnormality has occurred. In this case, the transport robot 100 may decelerate or stop. This can prevent an excessive load from being applied to the transport robot 100.

In the case of (2), the detection unit 160 detects a transfer abnormality in advance according to the marker 510 included in the front image before transfer. For example, the detection unit 160 detects from the image of the marker 510 that the package 500 is not placed on the installed shelf 300 at an appropriate position or angle. Alternatively, when the marker 510 is not included in the captured image, the detection unit 160 detects that the package 500 is not placed on the installed shelf 300. In these cases, the detection unit 160 detects a transfer abnormality. Alternatively, when the identification number of the marker 510 cannot be read, the detection unit 160 detects a transfer abnormality. When the read identification number is not appropriate, the detection unit 160 detects a transfer abnormality. When a transfer abnormality is detected, the transport robot 100 may decelerate or stop. This makes it possible to prevent abnormalities from occurring.

In the case of (3), when the state changes on the shelf board 210 in the order of: a state in which the package 400 is present, a state in which the package 400 and the package 500 are absent, and a state in which the package 500 is present, the detection unit 160 detects that the transfer has been performed normally. If not, the detection unit 160 detects that there is a transfer abnormality. In this case, the package 400 has not been transferred from the transport robot 100 to the installed shelf 300, or the package 500 has not been transferred from the installed shelf 300 to the transport robot 100. Therefore, the detection unit 160 determines that a transfer abnormality has occurred.

In the case of (4), when the identification information of the marker 510 detected by the rear sensor 121 is the same before and after transfer, the detection unit 160 detects that the transfer is abnormal. When the identification number of the marker 510 detected by the rear sensor 121 changes before and after transfer, the detection unit 160 detects that the transfer was performed normally.

The detection unit 160 only needs to use one of the determination conditions (1) to (4) described above to detect a transfer abnormality. In other words, the detection unit 160 does not need to use one or more of the determination conditions (1) to (4). For example, the detection unit 160 may determine whether there is a transfer abnormality using only drive information. Alternatively, the detection unit 160 may determine whether there is a transfer abnormality using only the rear image. Of course, the detection unit 160 may determine whether there is a transfer abnormality using any two or three of the determination conditions (1) to (4) described above. The detection unit 160 may determine whether there is a transfer abnormality using all of the determination conditions (1) to (4) described above.

The communication unit 164 transmits an abnormality signal indicating that a transfer abnormality has occurred to another transport robot 100A, a server device 800, or a user terminal 900. Thereby, the transport robot 100 can notify another transport robot 100A and the user that a transfer abnormality has occurred. For example, the server device 800 is a computer that collects information from a plurality of transport robots 100, user terminals 900, and the like. The user terminal 900 is a device through which a user inputs information used to request transportation of a package. In this case, a user nearby may resolve the transfer abnormality. Therefore, a package can be transported efficiently.

The communication unit 164 may send the abnormality signal only to the server device 800. The abnormality signal is then transmitted to another transport robot 100A and the user terminal 900 via the server device 800. Communication between the transport robot 100 and the server device 800, another transport robot 100A, or the user terminal 900 is performed by wireless communication such as Wi-Fi (registered trademark). Therefore, the nearby user can resolve quickly, and the transport efficiency can be improved.

The notification unit 166 notifies that a transfer abnormality has occurred. For example, the notification unit 166 outputs an alarm sound, message sound, or the like from the speaker of the operation unit 130. The notification unit 166 may display the text of a message on the monitor of the operation unit 130 instead of outputting audio. Further, when a transfer abnormality is detected, the transport robot 100 may retry the transfer.

Figure 8:
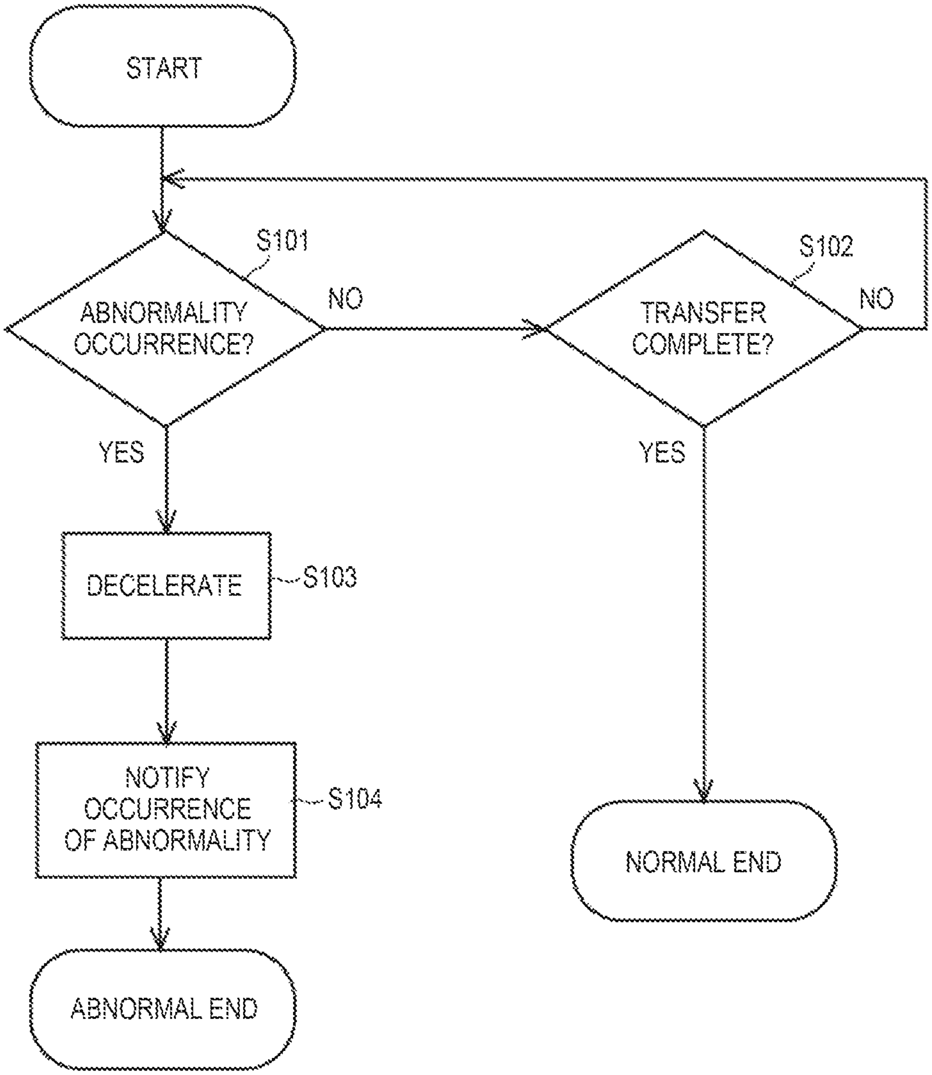
FIG. 8 is a flowchart illustrating processing for detecting a transfer abnormality.

Processing when a transfer abnormality is detected will be described using FIG. 8. FIG. 8 is a flowchart illustrating processing for detecting a transfer abnormality. First, the detection unit 160 determines whether a transfer abnormality has occurred (S101). For example, the detection unit 160 determines whether an abnormality has occurred based on drive information such as drive torque. For example, when the drive torque does not exceed the threshold value, the detection unit 160 determines that no transfer abnormality has occurred. When the drive torque exceeds the threshold value, the detection unit 160 determines that a transfer abnormality has occurred. Alternatively, the detection unit 160 may detect a transfer abnormality based on the image of the marker 510 included in the front image.

When no transfer abnormality has occurred (NO in S101), the detection unit 160 determines whether the transfer has been completed (S102). For example, the detection unit 160 determines whether the transfer has been completed based on the rear image. The detection unit 160 determines that the transfer has been completed when the identification information of the marker 510 in the rear image has changed. When the transfer is completed (YES in S102), transfer processing ends normally. When the transfer is not completed (NO in S102), the processing returns to step S101. For example, the transport robot 100 passes through the installed shelf 300 again and executes the transfer processing. The transport robot 100 may repeat the processing until the transfer is successfully completed.

When a transfer abnormality occurs (YES in S101), the transport robot 100 decelerates (S103). In other words, the drive control unit 162 gradually reduces the rotation speed of the wheel 111. Alternatively, the drive control unit 162 applies the brakes. This causes the transport robot 100 to decelerate. Here, the transport robot 100 may be decelerated until it stops.

Further, the transport robot 100 notifies that a transfer abnormality has occurred (S104). In other words, the notification unit 166 generates an alarm sound or the like. Alternatively, the communication unit 164 transmits an abnormality signal to another transport robot 100A, the server device 800, and the user terminal 900. By doing so, the nearby user can be notified of the transfer abnormality. Therefore, the nearby user can confirm whether there is any problem with the mounting position of the packages 400, 500. Alternatively, the nearby user can check whether there is any abnormality in the installation of the installed shelf 300 or the shelf unit 200. Therefore, the transport robot 100 can efficiently transport the package because it can be quickly resolved.

Next, examples of transfer abnormalities will be described using FIGS. 9 to 12. FIGS. 9 to 12 are side views each schematically illustrating an example of a transfer abnormality. In FIGS. 9 to 12, the configurations are simplified as appropriate.

Figure 9:
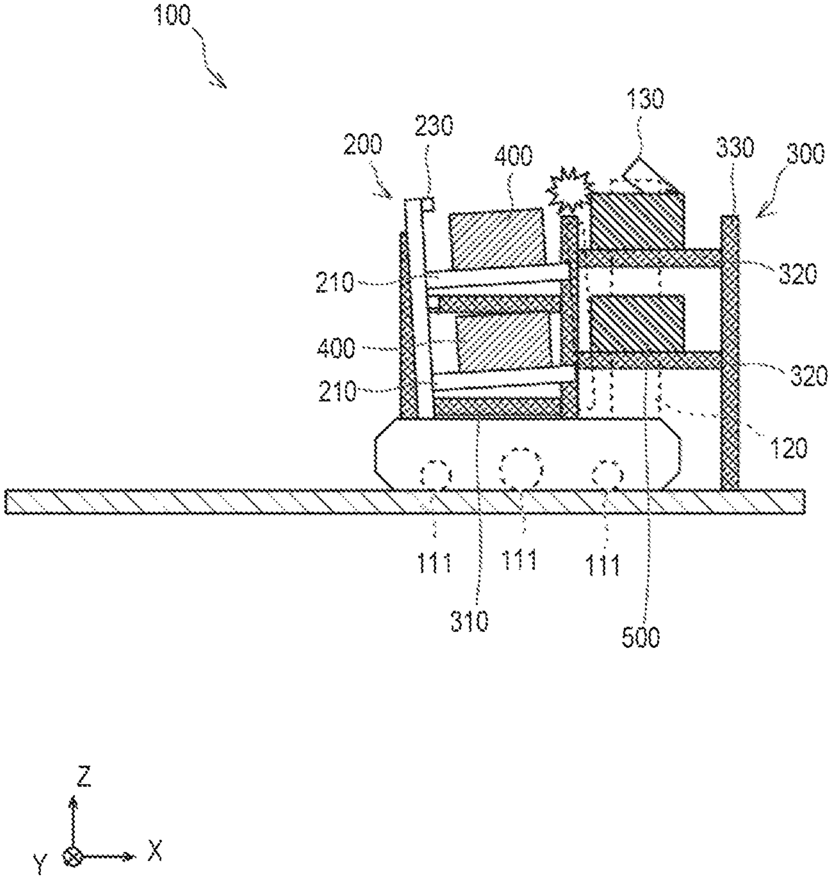
FIG. 9 is a side view illustrating an example of a transfer abnormality.

FIG. 9 is a diagram schematically illustrating a state where the shelf unit 200 and the installed shelf 300 collide. The height of at least one of the installed shelf 300 and the shelf unit 200 is deviated, and thus the shelf board 210 collides with the second shelf board 320. For example, the raising/lowering height of the raising/lowering stage 140 is deviated upward or downward. Alternatively, the mounting height of the shelf unit 200 with respect to the raising/lowering stage 140 is deviated. Alternatively, the height of the installed shelf 300 is deviated. In these cases, since the package 500 is normally mounted, it is difficult to detect an abnormality from the front image of the front sensor 131. Therefore, the detection unit 160 detects an abnormality based on the detected value of the drive sensor 116. That is, when the drive torque value detected by the drive sensor 116 shows an abnormal value, the detection unit 160 detects the abnormality. Therefore, the transport robot 100 can be safely stopped.

Figure 10:
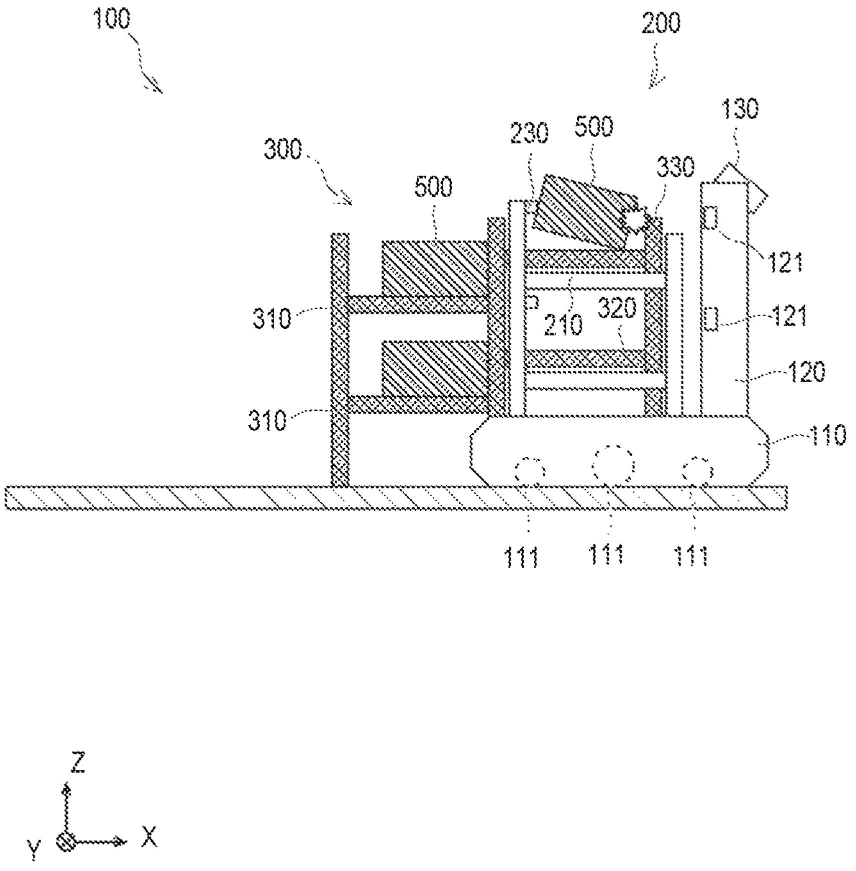
FIG. 10 is a side view illustrating an example of a transfer abnormality.

FIG. 10 is a diagram schematically illustrating a case where the package 500 collides with the installed shelf 300. In FIG. 10, the height of at least one of the installed shelf 300 and the shelf unit 200 is deviated. Therefore, the shelf board 210 collides with the second shelf board 320. The package 500 is stuck between the shelf unit 200 and the installed shelf 300. Therefore, the package 500 is not transferred normally.

In such a case, it is difficult to detect an abnormality using the front image of the front sensor 131. Therefore, the detection unit 160 detects an abnormality based on the detected value of the drive sensor 116. That is, when the drive torque value detected by the drive sensor 116 shows an abnormal value, the detection unit 160 detects the abnormality. Therefore, the transport robot 100 can be safely stopped.

Figure 11:
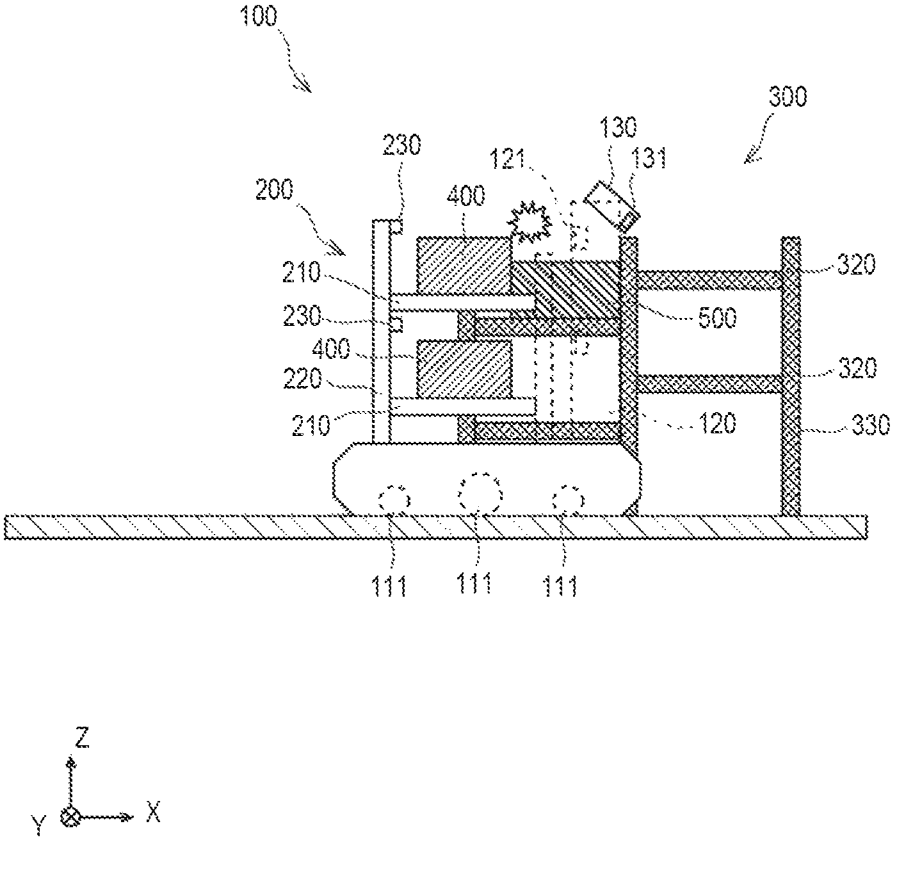
FIG. 11 is a side view illustrating an example of a transfer abnormality.
Figure 12:
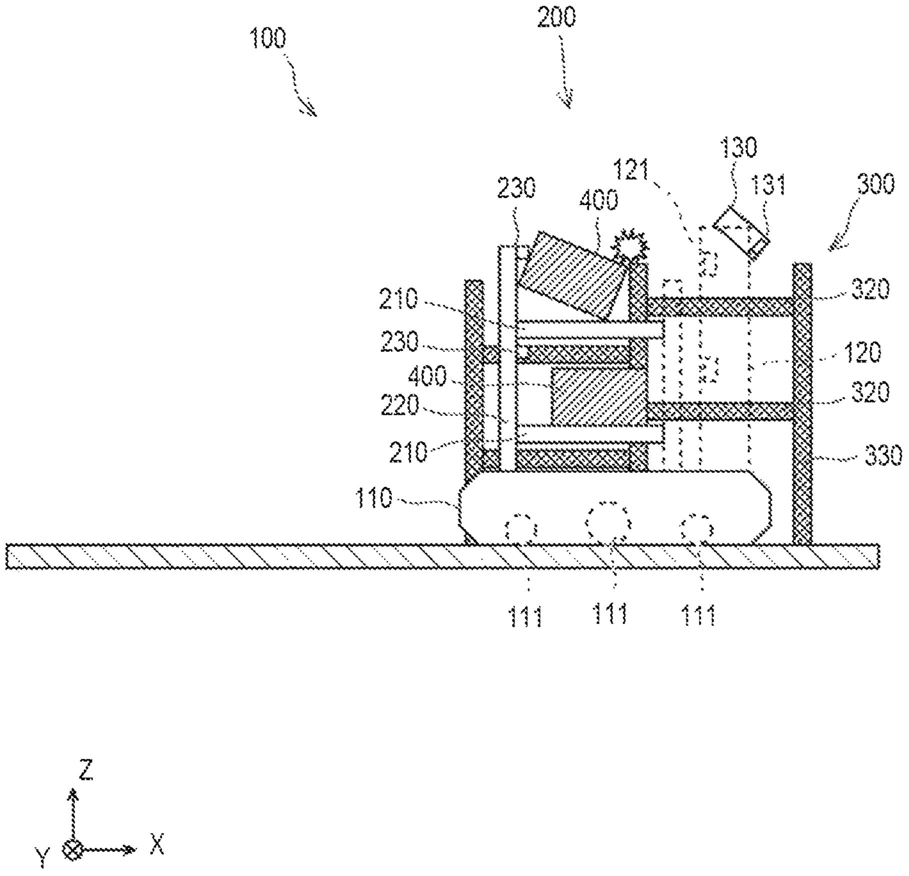
FIG. 12 is a side view illustrating an example of a transfer abnormality.

In FIG. 11, the position of the package 500 on the installed shelf 300 is deviated from its normal position in the front-rear direction. Therefore, the package 500 is interposed between the package 400 and the installed shelf 300. Therefore, the package 400 is not transferred to the installed shelf 300, resulting in a transfer abnormality. In this case, the detection unit 160 detects the transfer abnormality based on the front image or the rear image. FIG. 12 illustrates a case where the package 400 is mounted on the shelf unit 200 at an angle. In this case, the detection unit 160 can detect the state based on the front image or the rear image.

In this way, the detection unit 160 can detect a transfer abnormality based on the detection result of the drive sensor 116. The detection unit 160 applies a large drive torque to the wheel 111 when the transport robot 100 including the shelf unit 200 comes into contact with the installed shelf 300 or the package 500. Therefore, the drive sensor 116 detects a large drive torque. The detection unit 160 compares the drive torque of the wheel 111 detected by the drive sensor 116 with a threshold value. Then, when the detected drive torque is equal to or greater than the threshold value, the detection unit 160 detects a transfer abnormality. By doing so, it is possible to appropriately detect a transfer abnormality. Therefore, the package can be transported appropriately.

Further, the wheels 111 are provided on the right and left sides of the transport robot 100. Depending on the direction and location of the collision, the difference in drive torque applied to the right and left drive wheels becomes large. In the right-left direction, the drive torque on the collision side increases. The detection unit 160 may detect an abnormality when the difference between the right and left drive torques is a predetermined value. By doing so, it is possible to appropriately detect a transfer abnormality. Therefore, the package can be transported appropriately.

The packages 400, 500 are provided with markers. The front sensor 131 or the rear sensor 121 is an optical sensor that detects markers. By doing so, it is possible to appropriately detect a transfer abnormality. For example, a sensor unit 170 includes the front sensor 131 and the rear sensor 121. The front sensor 131 is arranged facing forward in the movement direction. The rear sensor 121 is arranged facing rearward in the movement direction. By doing so, it is possible to capture images of each of the packages 400, 500 before and after transfer. The detection unit 160 can appropriately detect transfer abnormalities by using the front image or the rear image. Therefore, the package can be transported appropriately.

In the above description, the package 400 and the package 500 both are transferred by the transfer operation of transport robot 100, but only one may be transferred. For example, when the transport robot 100 performs a transfer operation with no package 400 placed on the shelf unit 200, the package 500 on the installed shelf 300 is transferred to the shelf unit 200. Alternatively, when the transport robot 100 performs a transfer operation in a state where the package 500 is not placed on the installed shelf 300, the package 400 of the shelf unit 200 is transferred to the installed shelf 300.

Second Embodiment

Figure 13:
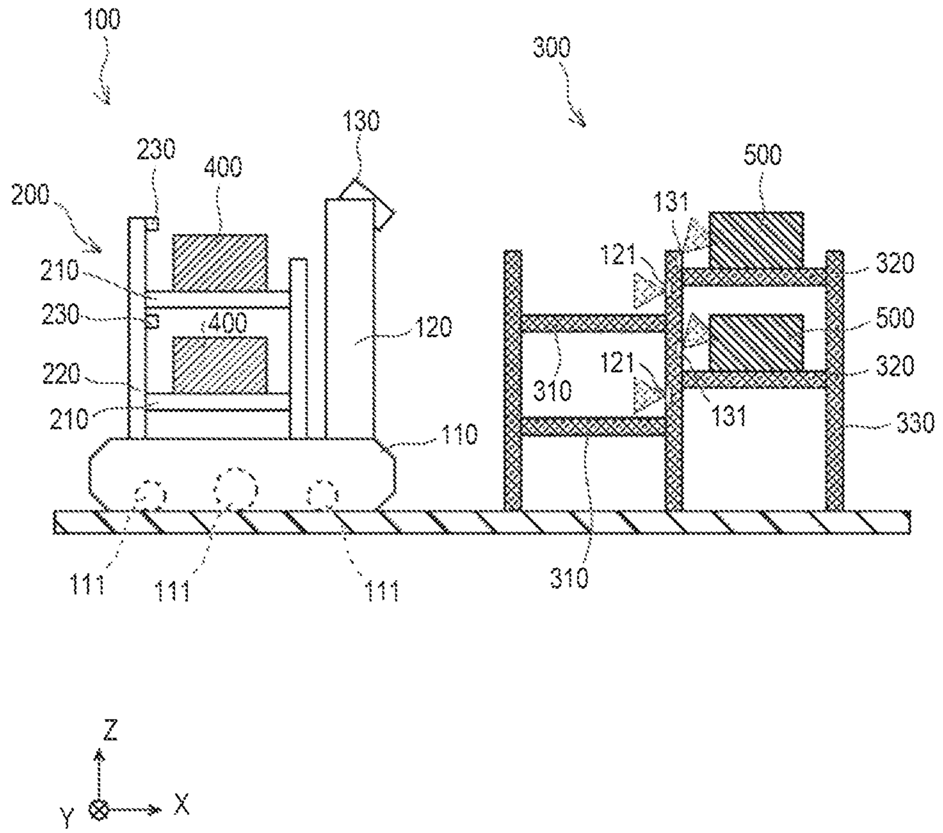
FIG. 13 is a side view schematically illustrating a configuration of a transport system according to a second embodiment.

A transport system 1 according to the present embodiment will be described using FIG. 13. FIG. 13 is a side view illustrating the configuration of the transport system 1. In the present embodiment, the positions of the front sensor 131 and the rear sensor 121 are different from those in the first embodiment. FIG. 13 illustrates the state before transfer.

The front sensor 131 and the rear sensor 121 are mounted on the installed shelf 300. The front sensor 131 is arranged facing forward in the movement direction and captures a front image. The rear sensor 121 is arranged facing rearward in the movement direction and captures a rear image.

Therefore, before transfer, the front sensor 131 captures the images of the package 500 on the installed shelf 300, and the rear sensor 121 captures the images of the package 400 on the shelf unit 200. Further, after transfer, the rear sensor 121 captures the images of the package 400 transferred to the installed shelf 300. Therefore, by using the front image or the rear image, it is possible to appropriately detect a transfer abnormality. Therefore, the package can be transported appropriately.

Third Embodiment

Figure 14:
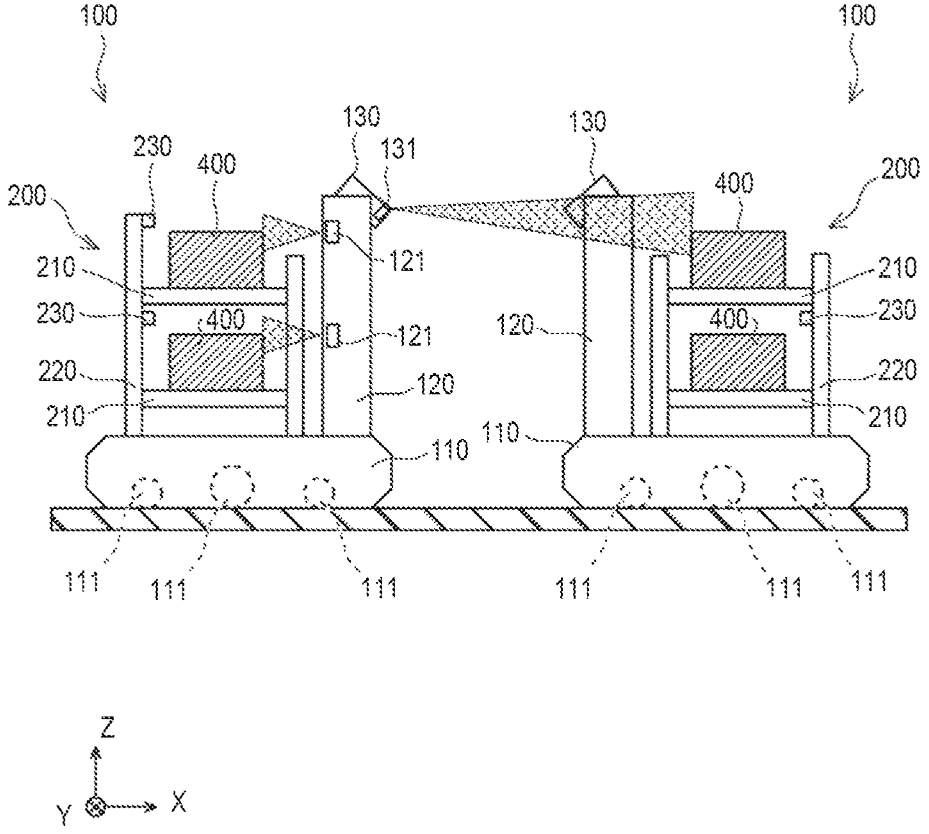
FIG. 14 is a side view schematically illustrating a configuration of a transport system according to a third embodiment.

A transport system 1 according to the present embodiment will be described using FIG. 14. FIG. 14 is a side view illustrating the configuration of the transport system 1. In the present embodiment, a shelf unit 200 mounted on the transport robot 100 is provided instead of the installed shelf 300. In other words, a package 400 is transferred between the installed shelves of two transport robots 100.

Here, the movement directions thereof are opposite to each other. Alternatively, only one transport robot 100 is moving. The packages 400 of two transport robots 100 are transferred to each other. In such a configuration, it is also possible to detect a transfer abnormality. Therefore, the package can be transported appropriately. In the present embodiment, the shelf unit 200 mounted on one transport robot 100 serves as a carrier, and the shelf unit 200 mounted on the other transport robot 100 serves as a shelf on which the package 400 is placed. Further, the shelf on which the package 400 is placed may be a movable shelf. For example, the shelf on which the package is placed may be a movable shelf that is mounted on the other transport robot 100 and moves. The package placed on the carrier may be transferred to a movable shelf that is moved by the other transport robot.

The transport robot 100 may use a machine learning model such as deep learning in route search and control of the drive control unit 162.

Further, part or all of the processing in the transport robot 100 and the like described above can be realized as a computer program. Such programs can be stored and provided to a computer using various types of non-transitory computer-readable media. Non-transitory computer-readable media includes various types of tangible storage media. Examples of non-transitory computer-readable media include magnetic recording media (for example, floppy disks, magnetic tape, hard disk drives), magneto-optical recording media (for example, magneto-optical discs), CD-read only memory (ROM), CD-R, CD-R/W, semiconductor memory (for example, mask ROM, programmable ROM (PROM), erasable PROM (EPROM), Flash ROM, random access memory (RAM)). The program may also be provided to the computer on various types of transitory computer-readable media. Examples of transitory computer-readable media include electrical signals, optical signals, and electromagnetic waves. The transitory computer-readable medium can provide the program to the computer via wired communication channels, such as electrical wires and fiber optics, or wireless communication channels.

The applicable embodiment is not limited to the above-described embodiment, and can be modified as appropriate without departing from the spirit thereof. For example, although the above-described embodiment describes a system in which a transport robot moves autonomously within a hospital, the above-described system can transport predetermined items as packages in a hotel, restaurant, office building, event venue, or complex facility.

What is claimed is:

1. A transport system comprising:
a carrier provided for placing a package to be transferred on a shelf or for transferring the package from the shelf;
a transport robot on which the carrier is mounted and configured to move to transfer the package between the shelf and the carrier, the transport robot including wheels provided on right and left sides of the transport robot, and a drive sensor configured to detect drive information regarding drive of the wheels;
a sensor unit provided to detect presence or absence of the package on the shelf or the carrier; and
a detection unit configured to detect an abnormality in transfer of the package according to a detection result of the sensor unit and when a difference in drive torque between the wheels provided on the right and left sides of the transport robot is a predetermined value.

2. The transport system according to claim 1,
wherein the package is provided with a marker, and
wherein the sensor unit is an optical sensor configured to detect the marker.

3. The transport system according to claim 2, wherein the sensor unit includes,
a first sensor arranged facing forward in a movement direction of the transport robot, and
a second sensor arranged facing rearward in the movement direction of the transport robot.

4. The transport system according to claim 3,
wherein the first sensor is configured to capture an image of the marker, and
wherein the transport robot is configured to approach the shelf based on the captured image of the marker.

5. The transport system according to claim 1, wherein when the detection unit detects the abnormality, the transport robot is configured to decelerate or stop.

6. The transport system according to claim 1, wherein when the detection unit detects the abnormality, the transport robot is configured to notify a server of occurrence of the abnormality.

7. The transport system according to claim 1, wherein the shelf is a mobile shelf configured to be mounted on another transport robot and moved.

8. The transport system according to claim 1, further comprising the shelf.

* * * * *